US010350795B2

(12) United States Patent
Cakmak et al.

(10) Patent No.: US 10,350,795 B2
(45) Date of Patent: *Jul. 16, 2019

(54) FLEXIBLE AND ELECTRICALLY CONDUCTIVE POLYMER FILMS AND METHODS OF MAKING SAME

(75) Inventors: Mukerrem Cakmak, Munroe Falls, OH (US); Wei Zhao, Mount Vernon, IN (US); Baris Yalcin, Woodbury, MN (US)

(73) Assignee: THE UNIVERSITY OF AKRON, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/383,988

(22) PCT Filed: Jul. 15, 2010

(86) PCT No.: PCT/US2010/042185
§ 371 (c)(1),
(2), (4) Date: Feb. 28, 2012

(87) PCT Pub. No.: WO2011/008993
PCT Pub. Date: Jan. 20, 2011

(65) Prior Publication Data
US 2012/0153236 A1 Jun. 21, 2012

Related U.S. Application Data

(60) Provisional application No. 61/225,767, filed on Jul. 15, 2009, provisional application No. 61/225,802, filed on Jul. 15, 2009.

(51) Int. Cl.
*H01B 1/04* (2006.01)
*B29C 39/18* (2006.01)
(Continued)

(52) U.S. Cl.
CPC ............... *B29C 39/18* (2013.01); *B29D 7/01* (2013.01); *B32B 5/02* (2013.01); *B32B 5/08* (2013.01);
(Continued)

(58) Field of Classification Search
CPC ........................................................ H01B 1/04
(Continued)

(56) References Cited

U.S. PATENT DOCUMENTS 3,360,394 A * 12/1967 Griffin et al. ................... 442/76
5,679,456 A * 10/1997 Sakai ........................ B29B 9/14
428/189

(Continued)

FOREIGN PATENT DOCUMENTS

WO   WO 2007/047662   *   4/2007
WO   WO 2008/066458   *   6/2008

OTHER PUBLICATIONS

Neves et al, International Journal of Nanomedicine, 2007, 2(3), 433-448.*

(Continued)

*Primary Examiner* — William D Young
(74) *Attorney, Agent, or Firm* — Renner Kenner Greive Bobak Taylor & Weber

(57) ABSTRACT

A method for producing flexible, stretchable transparent and highly electrically conducting hybrid polymer films includes embedding electrically conductive electrospun nanofibers in solution cast dielectric polymer films. The electrically conductive nanofiber, or nanofiber structure, can be electrospun from a suitable polymer solution that contains a suitable amount of, for example, at least one conductive material. The polymer film portion can be formed from poly(methyl methacrylate) (PMMA) or polyimide. The flexible polymer (Continued)

film portion can be a transparent film, made from, for example, polycarbonate, polyurethane and/or cyclopolyolefin polymer compositions.

16 Claims, 14 Drawing Sheets

(51) Int. Cl.
| | |
|---|---|
| B29D 7/01 | (2006.01) |
| D01D 5/00 | (2006.01) |
| B32B 33/00 | (2006.01) |
| B32B 5/02 | (2006.01) |
| B32B 5/08 | (2006.01) |
| B32B 27/12 | (2006.01) |
| B32B 27/28 | (2006.01) |
| B32B 27/30 | (2006.01) |
| B32B 27/32 | (2006.01) |
| B32B 27/36 | (2006.01) |
| B32B 27/40 | (2006.01) |
| B29K 105/16 | (2006.01) |

(52) U.S. Cl.
CPC ............ *B32B 27/12* (2013.01); *B32B 27/281* (2013.01); *B32B 27/308* (2013.01); *B32B 27/325* (2013.01); *B32B 27/365* (2013.01); *B32B 27/40* (2013.01); *B32B 33/00* (2013.01); *D01D 5/0084* (2013.01); *B29K 2105/162* (2013.01); *B29K 2995/0005* (2013.01); *B32B 2260/021* (2013.01); *B32B 2260/046* (2013.01); *B32B 2262/02* (2013.01); *B32B 2262/12* (2013.01); *B32B 2264/105* (2013.01); *B32B 2307/202* (2013.01); *B32B 2307/412* (2013.01); *B32B 2307/546* (2013.01); *B32B 2457/00* (2013.01)

(58) Field of Classification Search
USPC .......................................... 252/500, 510, 502
See application file for complete search history.

(56) References Cited

U.S. PATENT DOCUMENTS

| | | | |
|---|---|---|---|
| 2001/0045547 A1* | 11/2001 | Senecal et al. ............ | 252/501.1 |
| 2007/0144124 A1* | 6/2007 | Schewe et al. .................. | 55/487 |
| 2007/0286982 A1* | 12/2007 | Higgins et al. ................. | 428/95 |
| 2008/0191606 A1* | 8/2008 | Geohegan et al. ........... | 313/501 |
| 2009/0020921 A1* | 1/2009 | Cakmak et al. .............. | 264/484 |
| 2010/0163283 A1* | 7/2010 | Hamedi et al. ............... | 174/254 |

* cited by examiner

FLEXIBLE AND ELECTRICALLY CONDUCTIVE POLYMER FILMS AND METHODS OF MAKING SAME

RELATED APPLICATION DATA

This patent application claims priority to PCT Application No. PCT/US2010/042185, filed Jul. 15, 2010, which claims priority to U.S. Provisional Patent Application No. 61/225,767, filed on Jul. 15, 2009, entitled "Manufacturing of Multi-Functional Electrically Conductive/Transparent/Flexible Films;" and U.S. Provisional Patent Application No. 61/225,802, filed Jul. 15, 2009, entitled "Hybrid Manufacturing Method to Produce Stretchable, Flexible, Transparent and Electrically Conductive Polymer Films;" the entireties of which are hereby incorporated by reference herein.

FIELD OF THE INVENTION

The present invention relates to a method for producing flexible, stretchable transparent and highly electrically conducting hybrid polymer films comprising electrically conductive electrospun nanofibers embedded in solution cast dielectric polymer films. In one embodiment, the present invention utilizes an electrically conductive nanofiber, or nanofiber structure, that is embedded in a suitable polymer film. In one embodiment, the electrically conductive nanofiber, or nanofiber structure, can be electrospun from a suitable polymer solution that contains a suitable amount of, for example, at least one conductive material. In one embodiment, the flexible polymer film portion of the present invention can be formed from poly(methyl methacrylate) (PMMA) or polyimide. In another embodiment, the present invention relates to flexible polymer films that have conductive structures embedded therein, wherein the flexible polymer film portion is form via a casting process to produce transparent films from, for example, polycarbonate, polyurethane and/or cyclopolyolefin polymer compositions.

BACKGROUND OF THE INVENTION

Transparent conductive films are important components that, among other applications, are used as electrodes for various electronic devices such as liquid crystal displays (LCDs), plasma displays (PDs), touch panels, organic light-emitting diodes (OLEDs) and photovoltaics. Transparent conductive films also find use in electrostatic discharge (ESD) applications, though the required range of surface resistivity is much higher, $10^9$ to $10^{12}$ $\Omega$/sq, compared to that required for the display industry, usually lower than $10^3$ $\Omega$/sq. Indium tin oxide (ITO) is currently the choice for such films as it exhibits very unique properties combining optical transparency (approximately 90 percent) and low electrical resistivity (100 $\Omega$/sq). However, indium tin oxide (ITO) poses several problems when improved flexibility of the final device is desired/needed. Thin ITO layers on flexible substrates such as PET are brittle and easily shattered when bent and rolled repeatedly. This typically results in lost conductivity at very small strains, for example at 2.5 percent (see, e.g., Danran R. Cairns et al.; Applied Physics Letters; 2000; Vol. 76; No. 11; pp. 1425 to 1427). This problem becomes more severe when stretchability to large strains coupled with bendability and rollability is required. There are several situations where stretchability is desired alongside with flexibility in electronic materials including displays. In a continuous roll-to-roll (R2R) process of display manufacturing, it is possible the substrate will be exposed to high levels of strain, especially during thermoforming In addition, future displays, solar cells, wearable electronics and skin attached implant sensors require stretchability and more desirably subsequent recovery after cessation of stress.

Several studies describe the preparation of transparent electrically conductive flexible films where ITO is completely eliminated. Carbon nanotubes, graphenes and intrinsically conducting and solution processable polymers such as PEDOT-PSS have been the most commonly utilized materials. (see, e.g.: (1) Zhuangchun Wu et al.; Science; 2004; Vol. 305; pp. 1273 to 1276; (2) Keun Soo Kim et al.; Nature, 2009; Vol. 457; pp. 706 to 710; (3) Yue Sun et al.; Synthetic Metals; 1996; Vol. 82; pp. 35 to 40; (4) Jinyeol Kim et al.; Synthetic Metals; 2003; Vol. 139; pp. 485 to 489; (5) Jyongsik Jang et al.; Advanced Functional Materials; 2005; Vol. 15; No. 3; pp. 494 to 502; (6) Jianyong Ouyang et al.; Advanced Materials; 2006; Vol. 18; pp. 2141 to 2144.)

Both carbon based films, for example, carbon nanotube and graphenes, rely on the formation of a continuous thin carbon film layer on top of a flexible substrate. For the preparation of these films, a transferring step, a complication for a continuous roll-to-roll (R2R) process, is typically required. Sputtering, reactive evaporation, chemical vapor deposition, the sol-gel processes and spray coating are other processes used to coat a thin continuous layer of electrically conducting layer on flexible substrates. Although such organic thin layers of electrically conductive carbon based materials deposited on flexible polymer substrates can tolerate repeated bending and flexing as demonstrated recently, the tolerance of such thin coating layers to high levels of stretching while maintaining conductivity is more challenging.

Thus, there is a need in the art for improved stretchable, flexible, transparent conductive polymer films, and a method for making same.

SUMMARY OF THE INVENTION

The present invention relates to a method for producing flexible, stretchable transparent and highly electrically conducting hybrid polymer films comprising electrically conductive electrospun nanofibers embedded in solution cast dielectric polymer films. In one embodiment, the present invention utilizes an electrically conductive nanofiber, or nanofiber structure, that is embedded in a suitable polymer film. In one embodiment, the electrically conductive nanofiber, or nanofiber structure, can be electrospun from a suitable polymer solution that contains a suitable amount of, for example, at least one conductive material. In one embodiment, the flexible polymer film portion of the present invention can be formed from poly(methyl methacrylate) (PMMA) or polyimide. In another embodiment, the present invention relates to flexible polymer films that have conductive structures embedded therein, wherein the flexible polymer film portion is form via a casting process to produce transparent films from, for example, polycarbonate, polyurethane and/or cyclopolyolefin polymer compositions.

In one embodiment, the present invention relates to a flexible and electrically conductive polymer film comprising: at least one electrically conductive nanofiber, or nanofiber structure, embedded in, located on, or attached to at least one polymer film, wherein the at least one electrically conductive nanofiber, or nanofiber structure, is formed from a electrospinning process and wherein the at least one polymer film is flexible.

In another embodiment, the present invention relates to a method for producing a flexible and electrically conductive polymer film comprising the steps of: (A) preparing at least one electrospinnable polymer composition; (B) electrospinning the at least one electrospinnable polymer composition to produce at least one electrically conductive nanofiber, or nanofiber structure, to produce an electrically conductive electrospun structure; and (C) casting at least one polymer film onto the electrically conductive electrospun structure of Step (B) to yield a flexible and electrically conductive polymer film, wherein the electrospinnable polymer composition of Step (A) is itself electrically conductive, or the electrospinnable polymer solution contains at least one electrically conductive material therein, and wherein the at least one electrically conductive nanofiber, or nanofiber structure, is located on or in, or is partially embedded in, the cast film of Step (C).

In still another embodiment, the present invention relates to a method for producing a flexible and electrically conductive polymer film comprising the steps of: (i) casting at least one polymer film onto a suitable surface; (ii) preparing at least one electrospinnable polymer composition; (iii) electrospinning the at least one electrospinnable polymer composition to produce at least one electrically conductive nanofiber, or nanofiber structure, on, in, or partially embedded in the cast film of Step (i), wherein the electrospinnable polymer composition of Step (ii) is either itself electrically conductive, or the electrospinnable polymer solution contains at least one electrically conductive material therein.

DETAILED DESCRIPTION OF THE INVENTION

Figure 1:
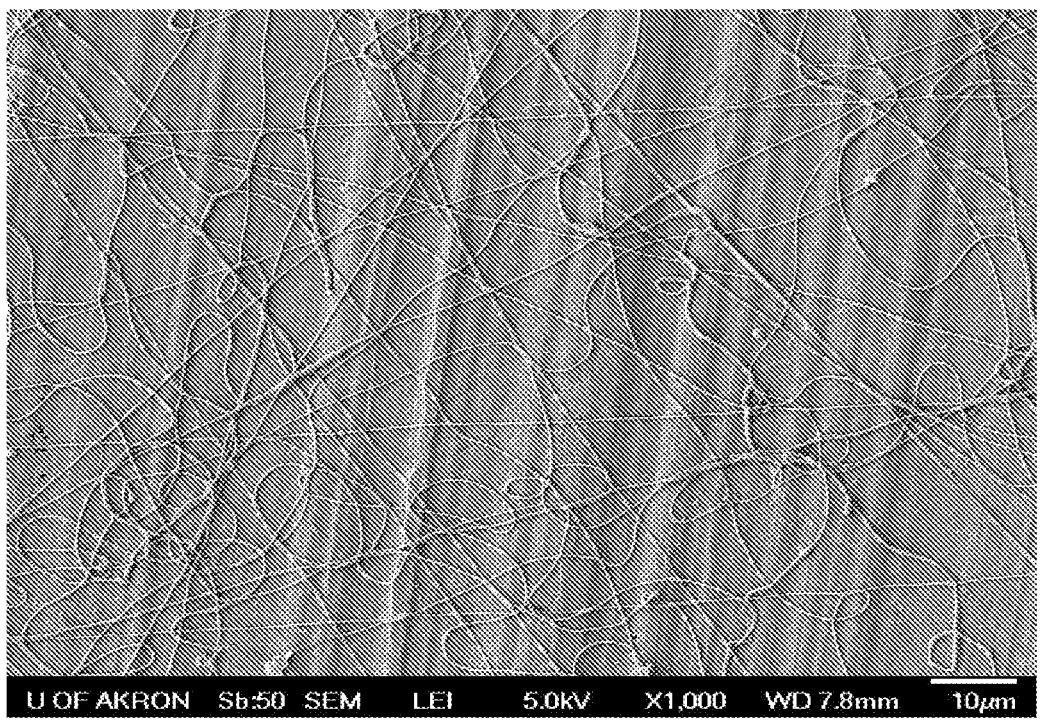
FIG. 1 is a photograph of SEM of conducting fibers on aluminum foil.

The present invention relates to a method for producing flexible, stretchable transparent and highly electrically conducting hybrid polymer films comprising electrically conductive electrospun nanofibers embedded in solution cast dielectric polymer films. In one embodiment, the present invention utilizes an electrically conductive nanofiber, or nanofiber structure, that is embedded in a suitable polymer film. In one embodiment, the electrically conductive nanofiber, or nanofiber structure, can be electrospun from a suitable polymer solution that contains a suitable amount of, for example, at least one conductive material. In one embodiment, the flexible polymer film portion of the present invention can be formed from poly(methyl methacrylate) (PMMA) or polyimide. In another embodiment, the present invention relates to flexible polymer films that have conductive structures embedded therein, wherein the flexible polymer film portion is formed via a casting process to produce transparent films from, for example, polycarbonate, polyurethane and/or cyclopolyolefin polymer compositions.

It should be noted that the thickness of the structures made in accordance with the present invention is not critical so long as the thickness thereof meets the design criteria of the desired endues for the flexible, transparent, electrically conductive film in question.

In one embodiment, the present invention discloses preparation of a highly stretchable, flexible and transparent electrically conductive hybrid polymer film(s) comprising electrically conductive electrospun nanofibers embedded in solution cast dielectric polymer films such as poly(methyl methacrylate) (PMMA) or polyimide.

In another embodiment, the present invention relates to a method for producing ultra-flexible, transparent and highly electrically conducting thin polymer films. Such films can be useful in flexible display applications. New concepts of flexible devices and electronics have arisen in recent years. "Rigid" devices, as known in the art, use transparent conductive films that are unable to withstand repeated flexing due to brittleness concerns and other weaknesses. These devices utilize indium tin oxide coated glass, polymer films and other various materials. In another embodiment, additional materials can be incorporated in the films of the present invention. Such additional materials include, but are not limited to, conductive polymer coated substrates. Such conductive polymers include, but are not limited to, polypyrrole, polyaniline and similar polymers.

As such, in one embodiment, the present invention relates to a hybrid process which combines electrospinning and solution casting through various processing strategies (conducting nanofibers electrospun from intrinsically conducting polymers such as polyaniline, polypyrollidine). Such a process allows the development of electrically conductive continuous nanofibers which are fully or partially embedded into another flexible or transparent substrate(s). These nanofibers should be spinnable while containing the necessary components to make the final solid state electrically conductive, while still maintaining flexibility. As such, a variety of novel blend of polymer/inorganic/organic/solvent component containing mixtures are disclosed herein. These mixtures may contain long chain polymer molecules, carbon based components, including carbon single wall or multi-wall nanotubes, conductive polymers, or other suitable conductive materials that are able to achieve the desired flexibility.

In one embodiment, a method in accordance with the present invention involves casting a polymer solution into a film form on pre-deposited electrically conducting nanofibers, or nanofiber structure, and then solidifying the film/nanofiber combination. The embedded nanofibers at small loadings render the entire film electrically conducting without sacrificing flexibility and transparency. The method of the present invention differs from those that utilize electrostatic spaying. In the latter, a thin continuous layer of spray deposited conducting film serves as the conducting pathway in close proximity to the film surface. In the method of the present invention the electrically conducting nanofibers are a conducting network with open spaces in between the fibers which improves transparency of the final film. In addition, the thin nanofibers are flexible and are not prone to cracking during continuous bending and rolling applications which can be otherwise detrimental to electrical conductivity over a long period of service time.

Conducting nanofibers that are electrospun from intrinsically conducting polymers such as polyaniline, polypyrrolidine are known in the art. These polymers, however, cannot be dissolved in common organic solvents and generally not suitable for industrial production environment. Thus, in one embodiment of the present invention, polyethylene oxide (PEO) is mixed with water soluble poly(3,4-ethylenedioxythiophene):poly(styrenesulfonate) (PEDOT:PSS) and/or single wall nanotubes to form an electrospinning solution.

As used herein the term nanofiber, or nanofibers, refers to fibers having an average diameter in the range of about 1 nanometer to about 25,000 nanometers (25 microns). In another embodiment, the nanofibers of the present invention are fibers having an average diameter in the range of about 1 nanometer to about 10,000 nanometers, or about 1 nanometer to about 5,000 nanometers, or about 3 nanometers to about 3,000 nanometers, or about 7 nanometers to about 1,000 nanometers, or even about 10 nanometers to about 500 nanometers. In another embodiment, the nanofibers of the present invention are fibers having an average diameter of less than 25,000 nanometers, or less than 10,000 nanometers, or even less than 5,000 nanometers. In still another embodiment, the nanofibers of the present invention are fibers having an average diameter of less than 3,000 nanometers, or less than about 1,000 nanometers, or even less than about 500 nanometers. Here, as well as elsewhere in the specification and claims, individual numerical range values, or limits, can be combined to form additional non-disclosed, or new, ranges.

In one embodiment, the present invention relates to transparent, flexible and electrically conductive structures that are formed from a combination of one or more nanofibers, or fibers, that are embedded in, located on, or attached to, a transparent polymer film. The transparent polymer film portion of the present invention should have a transmittance in the visible light range of at least about 50 percent, at least about 55 percent, at least about 60 percent, at least about 65 percent, at least about 70 percent, at least about 75 percent, at least about 80 percent, at least about 85 percent, at least about 90 percent, or even at least about 95 percent. Here, as well as elsewhere in the specification and claims, individual numerical range values, or limits, can be combined to form additional non-disclosed, or new, ranges. As would be apparent to those of skill in the art, methods to determine the transmittance of a visible light through a polymer film are known in the art and as such a discussion herein is omitted for the sake of brevity.

In one embodiment, any suitable conductive polymer compound that can be subjected to electrospinning, via the use of a suitable electrospinning solution, can be utilized in conjunction with the present invention. Such polymers include, but are not limited to, polyanilines (PANI), polypyrollidines, poly(fluorene)s, polypyrenes, polyazulenes, polynaphthalenes, poly(pyrrole)s (PPY), polycarbazoles, polyindoles, polyazepines, poly(thiophene)s (PT), poly(p-phenylene sulfide) (PPS), poly(acetylene)s (PAC), poly(p-phenylene vinylene) (PPV), poly(3,4-ethylenedioxythiophene) (PEDOT), poly(styrenesulfonate (PSS), a mixture of PEDOT/PSS, or suitable mixtures of any two or more thereof.

In another embodiment, any suitable polymer that can be electrospun into the desired nanofibers, or nanofiber structure, can be utilized in conjunction with the present invention, regardless of whether such a polymer is itself electrically conductive or not, so long as the electrospinning solution of such a polymer is combined, impregnated, or mixed with at least one electrically conductive material. Suitable electrically conductive materials for utilization in, or with, an electrospinning solution of a polymer include, but are not limited to, carbon-based components (e.g., including, but not limited to, carbon nanotubes or nanostructures, precursor compounds that generate conductive carbon compounds or structures upon heating and/or graphitization), conductive metal particles and/or nanoparticles (e.g., gold, silver, copper, etc. nanoparticles), conductive metal alloy particles and/or nanoparticles, or a combination of two or more thereof.

Suitable polymers that can be electrospun are known in the art. Such polymers include, but are not limited to, poly(ethylene oxide), polyimides, or any other polymer that can be subjected to an electrospinning process (such polymer compositions are known to those of skill in the art).

In one embodiment, the present invention utilizes a two-part method for forming film structures in accordance with the present invention. In this embodiment, the first portion of the two-part method is the electrospinning solution that is formed from a suitable polymer, or conductive polymer, and, if desired, one or more electrically conductive materials. This electrospinning solution is then utilized to produce a desired nanofiber, nanofibers, or nanofiber structure. In the embodiments where one or more electrically conductive materials are added to the electrospinning solution described above, the amount of one or more electrically conductive materials is not critical so long as the solution to which the one or more electrically conductive materials are added can be electrospun. In one embodiment, the amount of one or more electrically conductive materials is in the range of about 0.1 weight percent to about 20 weight percent, about 0.5 weight percent to about 17.5 weight percent, about 1 weight percent to about 15 weight percent, about 2.5 weight percent to about 12.5 weight percent, about 5 weight percent to about 10 weight percent, or even from about 6 weight percent to about 8 weight percent. Here, as well as elsewhere in the specification and claims, individual numerical range values, or limits, can be combined to form additional non-disclosed, or new, ranges. In one embodiment, the second portion of the two-part method is the casting solution that is formed from a suitable transparent polymer composition as described above.

The following examples describe the electrospinning and solution casting procedure to prepare the hybrid film of high conductivity and transparency. However, the present invention is not limited to just the following examples. Rather, any suitable combination of spinnable electrically conductive material that can be spun and then embedded in a suitable polymer thereby yielding the desired transparent, flexible and conductive film is within the scope of the present invention.

Example 1

Poly(ethylene oxide) (PEO) ($M_W$=400,000–0.484 grams) and poly(ethylene oxide) (PEO) ($M_W$=900,000–0.09 grams) is added into 13 mL Orgacon S-200HT (commercially available PEDOT:PSS) from Agfa and 2 mL N,N-dimethylformamide (DMF) mixture in a small vial. The solution is stirred by a magnetic stirring system until a homogenous solution is achieved. Then, 0.04 grams of P3-SWNT (single wall carbon nanotube) from Carbon Solution is added into the solution. This step is followed by ultrasonication in an ultrasonic cleaner for 40 minutes. The resulting solution is then ready for electrospinning.

Three grams of polycarbonate (for example, Lexan DMX grade from GE Plastic) is dissolved into 30 mL N,N-dimethylformamide (DMF) to yield a solution for film casting.

The electrospinning solution is added into a bottle with high voltage supply connected. In one embodiment, the electrospinning nozzle is a 21 gauge dispensable needle. A mirror finished aluminum plate (4 inches by 5 inches) is used as a collector, with the plate grounded. A voltage of 8 KV is applied and the nozzle-collector distance is 10 cm. The linear actuator in the hybrid process system is used to move the nozzle to cover the whole area of the collector. The fibers are collected under this condition for about 1 hour. The morphology of the nanofiber is shown in FIG. 1.

Figure 2:
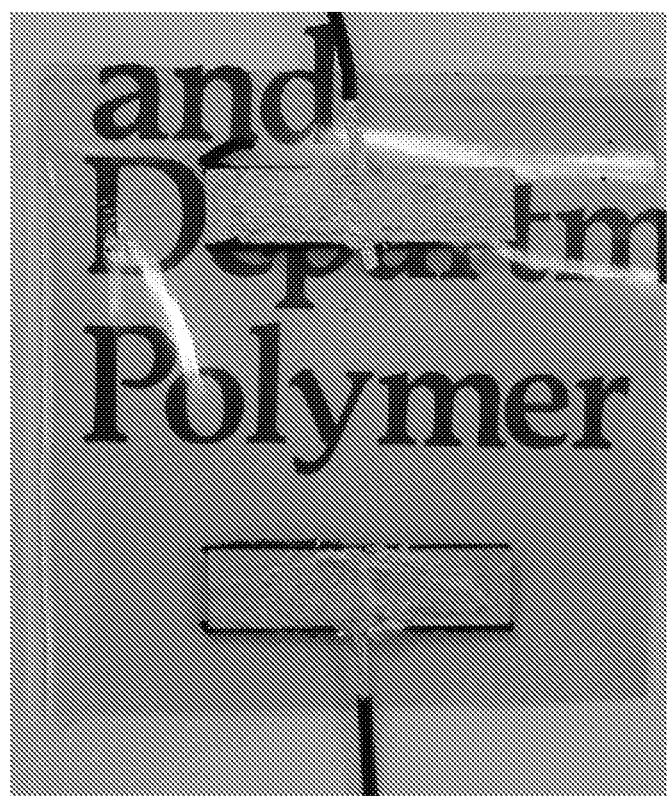
FIG. 2 is a photograph of the conductive film with electrodes attached.

After electrospinning, about 10 mL of the film casting solution is hand cast onto the collector. The collector is then placed into a leveled stage in the oven and dried at 60° C. for 2 hours then 80° C. for 24 hours. The film is then peeled off from the collector. The resulting film is shown in FIG. 2. In the composite film, the total content of the nanofiber portion is less than 1 weight percent. In the conducting fiber portions of the film, the carbon nanotube content is about 7 weight percent of the total weight of the nanofibers.

Figure 3:
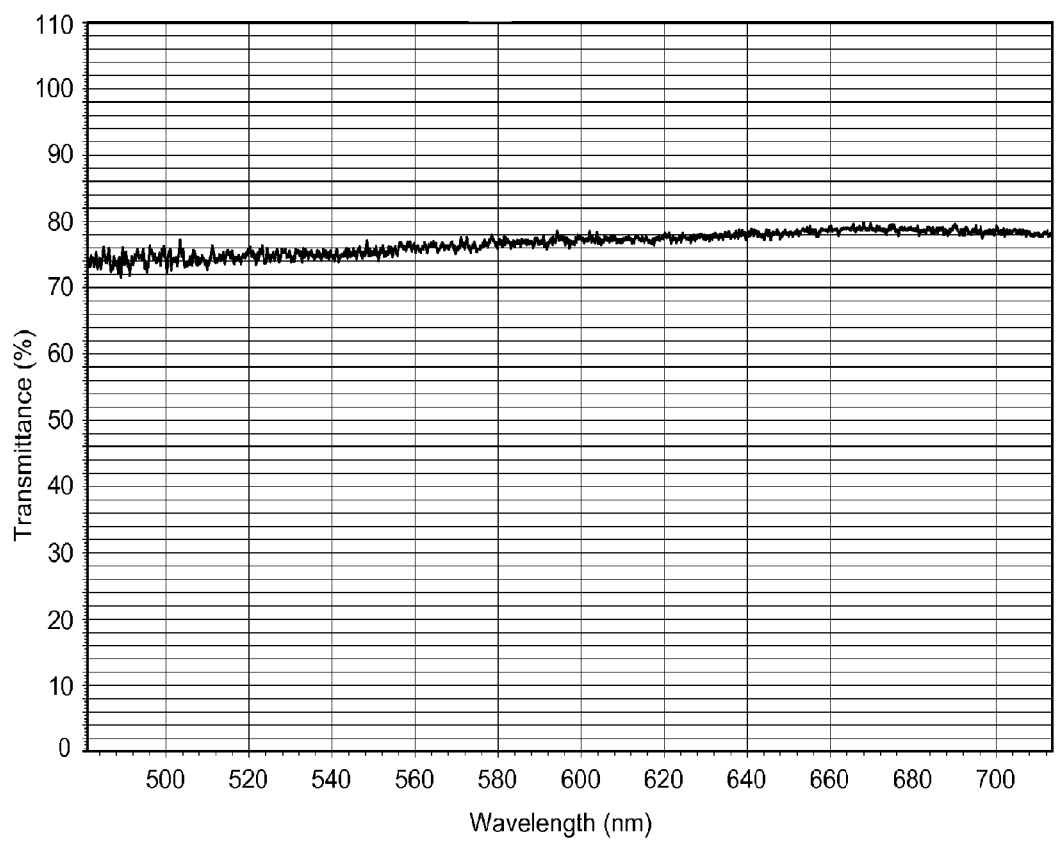
FIG. 3 is a graph of the transmittance of the conductive film.

The surface resistivity of the resulting film is determined to be 20 KOhm/sq., with the transmittance of the film in visible range of about 75 percent, as shown in FIG. 3.

Example 2

Five milliliters (5 mL) of Orgacon (commercially available PEDOT:PSS) from Agfa and 5 mL of Baytron (commercially available PEDOT:PSS) from H. C. Stark are mixed in a vial to achieve a homogeneous solution. One-half a gram PEO (poly(ethylene oxide)) ($M_W$=400,000) from SP² is added into the mixture and stirred by a magnetic stirring system until the solution is homogeneous. About 0.005 grams P3-SWNT (single wall carbon nanotubes) from Carbon Solution is added into the solution and followed with ultrasonication to achieve good dispersion of the SWNT in the solution. The resulting solution is then ready for electrospinning. Three grams of poly(methyl methacrylate) (PMMA) from Rohm & Haas is dissolved in 27 mL N,N-dimethylformamide (DMF) to yield a solution for solution casting.

The electrospinning solution is added into a bottle with a high voltage supply connected. The electrospinning nozzle is a 21 gauge dispensable needle. A mirror finished aluminum plate (4 inches by 5 inches) is used as a collector, with the plate grounded. A voltage of 8 KV is applied and the nozzle-collector distance is 10 cm. The linear actuator in the hybrid process system is used to move the nozzle to cover the whole area of the collector. The fibers are collected under this condition for about 40 minutes.

Figure 4:
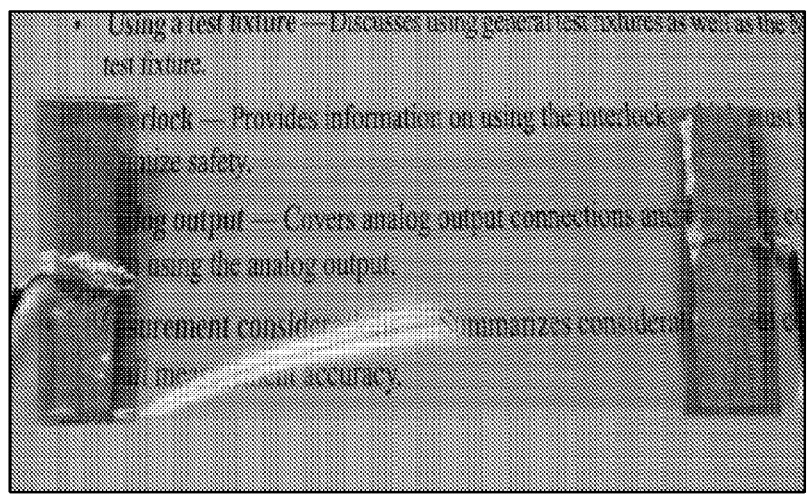
FIG. 4 is a photograph of conductive PMMA film.
Figure 5:
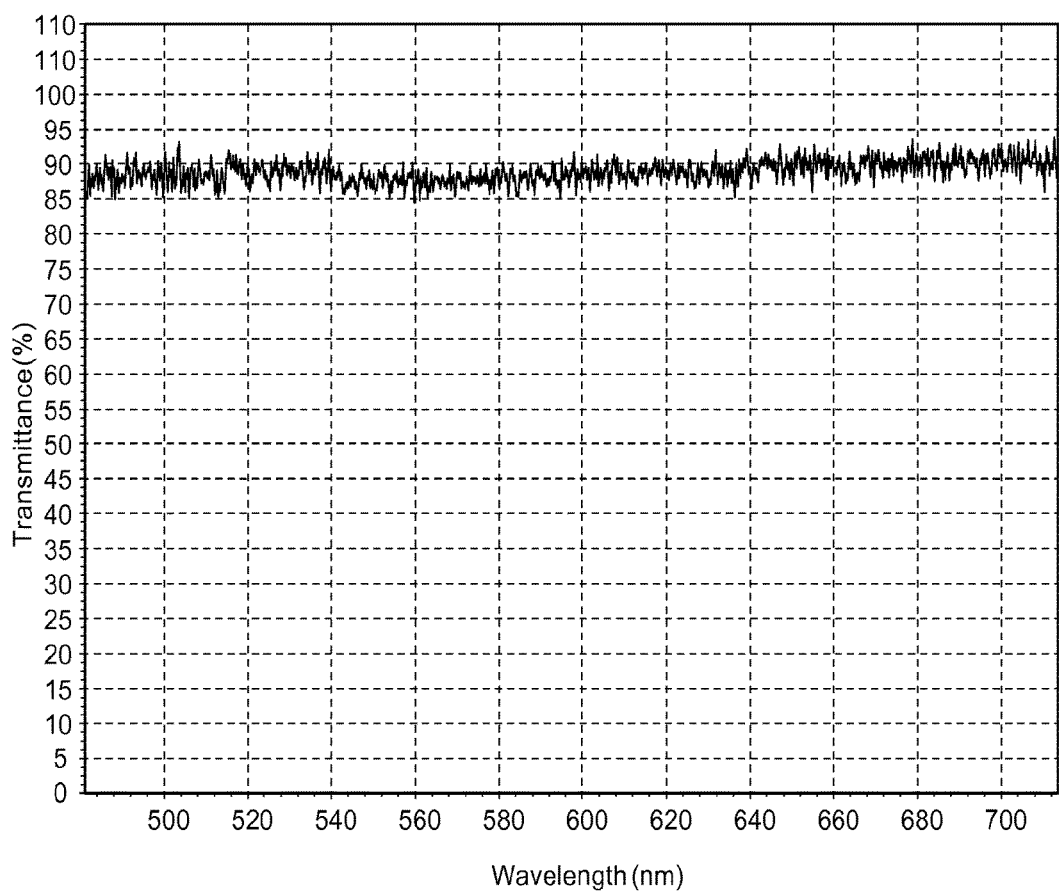
FIG. 5 is a graph of the transmittance of PMMA conductive film.

After electrospinning, about 10 mL of the film casting solution is hand cast onto the collector. The collector is then placed into a leveled stage in the oven and dried at 60° C. for 2 hours then 80° C. for 24 hours. Next, the film is peeled off from the collector. The film is shown in FIG. 4. In the composite film, the total content of the nanofiber is less than 1 percent and in the conducting fiber the carbon nanotubes content is less than 1 percent of the total weight of the nanofibers. The surface resistivity of the resulting film is about 100 KOhm/sq., and the transmittance of the film in visible range is above 85 percent, as shown in FIG. 5.

Figure 6:
FIG. 6 is a drawings detailing the simple bending test.
Figure 7:
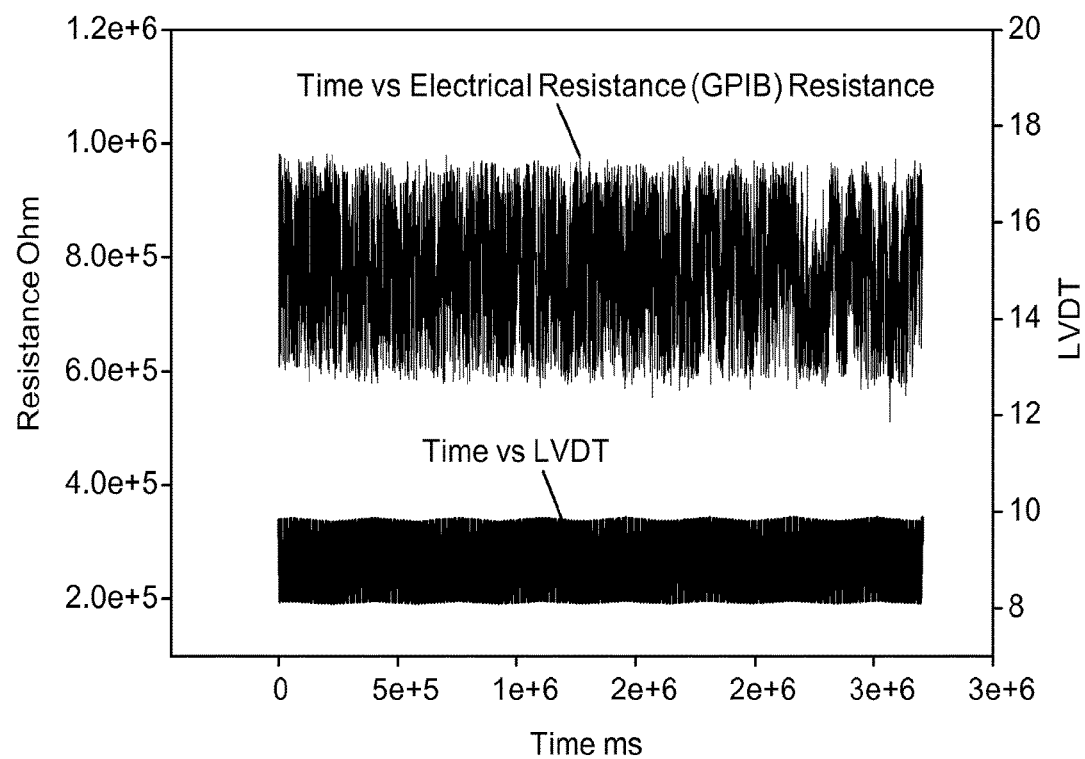
FIG. 7 is a graph of the cyclic bending test of the conductive PMMA film.

To test the flexibility of the conductive film, a simple cyclic bending test is done on the conductive film while monitoring the resistance of the film. A sketch of the bending test is shown in FIG. 6. The resistance of the film, as well as the position of the crosshead, is plotted against time as in FIG. 7. It is apparent that the resistance of the film remains the same as the film is bended through 200 cycles.

Example 3

Five milliliters of Orgacon (commercially available PEDOT:PSS) from Agfa and 5 mL of Baytron (commercially available PEDOT:PSS) from H. C. Stark are mixed in a vial to achieve a homogeneous solution. 0.35 grams poly(ethylene oxide) (PEO) ($M_W$=400,000) from SP² is added into the mixture and stirred by a magnetic stirring system until the solution is homogeneous. The resulting solution is then ready for electrospinning. Polyacrylonitrile (PAN) from Sigma-Aldrich is dissolved in N,N-dimethylformamide (DMF) to make a casting solution of 15 percent concentration.

The electrospinning solution is added into a bottle with high voltage supply connected. The electrospinning nozzle is a 21 gauge dispensable needle. A glass slide is used as a collector. A voltage of 8 KV is applied and the nozzle-collector distance is about 12 cm. The fibers are collected under this condition for about 15 minutes.

Figure 8:
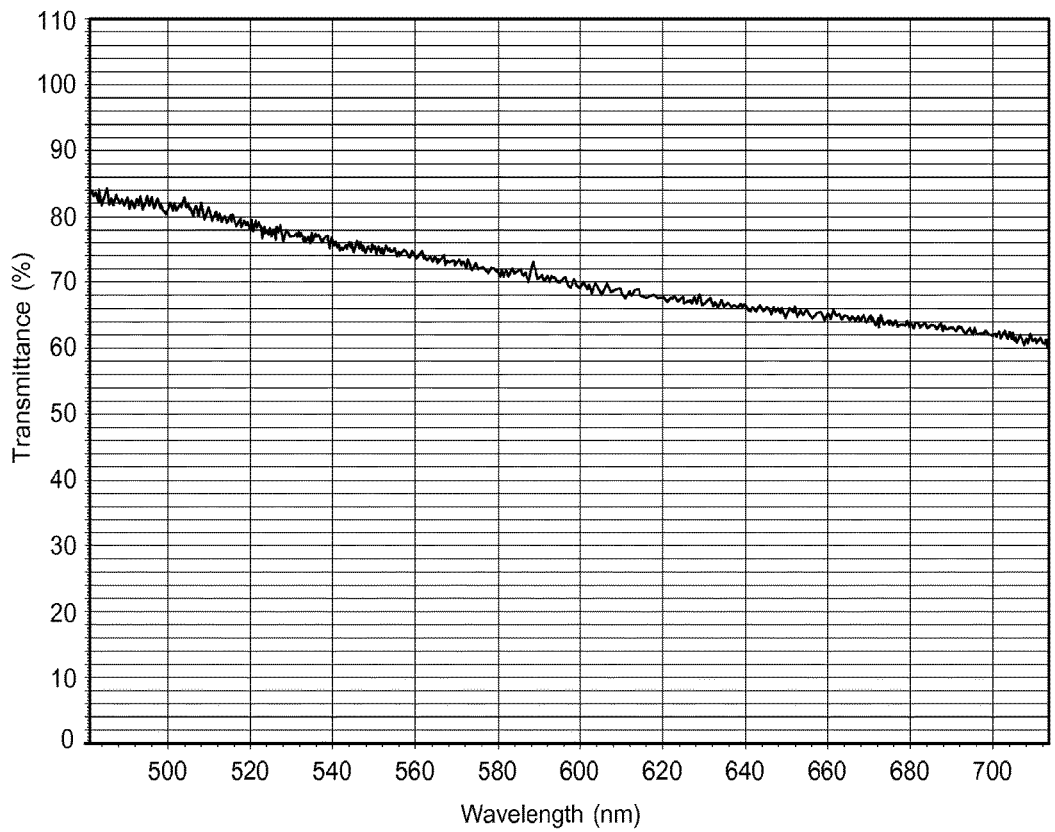
FIG. 8 is a graph of the transmittance of the conductive PAN film.

After electrospinning, the film casting solution is hand cast onto the collector. The collector is next placed into a leveled stage in the oven and dried at 60° C. for 2 hour then 80° C. for 24 hour. The film is peeled off from the collector. In the composite film, the total content of the nanofiber is less than 1 percent. The surface resistivity of the resulting film is about 4 KOhm/sq., with the transmittance of the film in the visible range above 60 percent, as shown in FIG. 8.

Additional Embodiments

In another embodiment, the present invention relates to a method for producing flexible, stretchable transparent and highly electrically conducting hybrid polymer films comprising electrically conductive electrospun nanofibers embedded in solution cast dielectric polymer films such as PMMA and polyimide. As mentioned above, recent advances in electronics, displays and materials have created a need for stretchability and flexibility in electronic materials. For example, in a continuous roll-to-roll (R2R) process of display manufacturing, the substrate may be exposed to high levels of strain, especially during thermoforming leading to substantially decreased levels of conductivity. In addition, future displays, solar cells, wearable electronics and skin attached implant sensors require stretchability and subsequent recovery after cessation of stress. In this embodiment, the present invention relates to polymer films that can be solution cast into transparent form such as polycarbonate, polyurethanes, cyclopolyolefins and the like.

Figure 9:
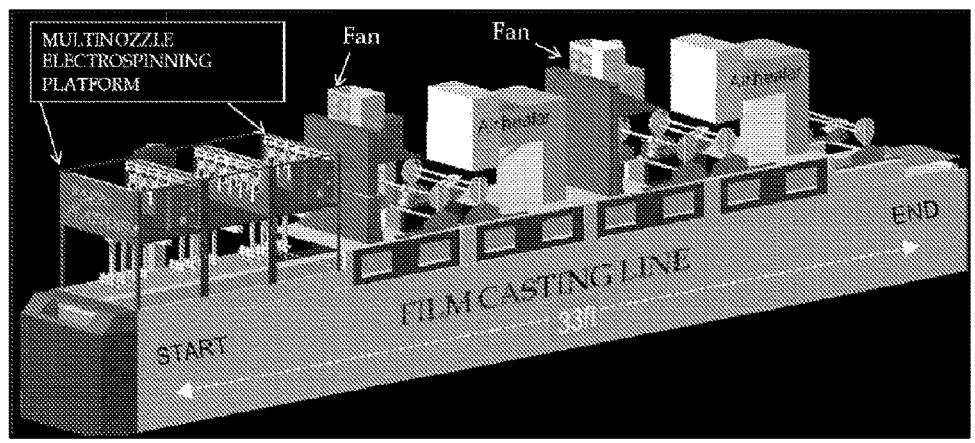
FIG. 9 is a drawing of a hybrid film manufacturing line.

The platform technology used to prepare the hybrid polymer films in the present invention comprises the combination of two process technologies, a thin film solution casting process and electrospinning process, as described in detail in Published PCT Patent Application No. WO 2007/047662, the entirety of which is hereby incorporated herein by reference. The hybrid film manufacturing platform which combines a multi-nozzle electrospinning platform integrated onto a solution casting line is shown in FIG. 9.

The platform consists of several stages with individually controlled spinnerets. Each spinneret has a dedicated Teflon container, pressure/vacuum line, high voltage power supply, disposable needles and valves. Each spinneret is held by a holder that has the X, Y and Z motion capability and hence can be set at relative distances to each other. This along with dedicated pressure/vacuum line and high voltage power capability allows different materials to be spun and/or sprayed simultaneously leading to various complex composite nanostructures.

Figure 10:
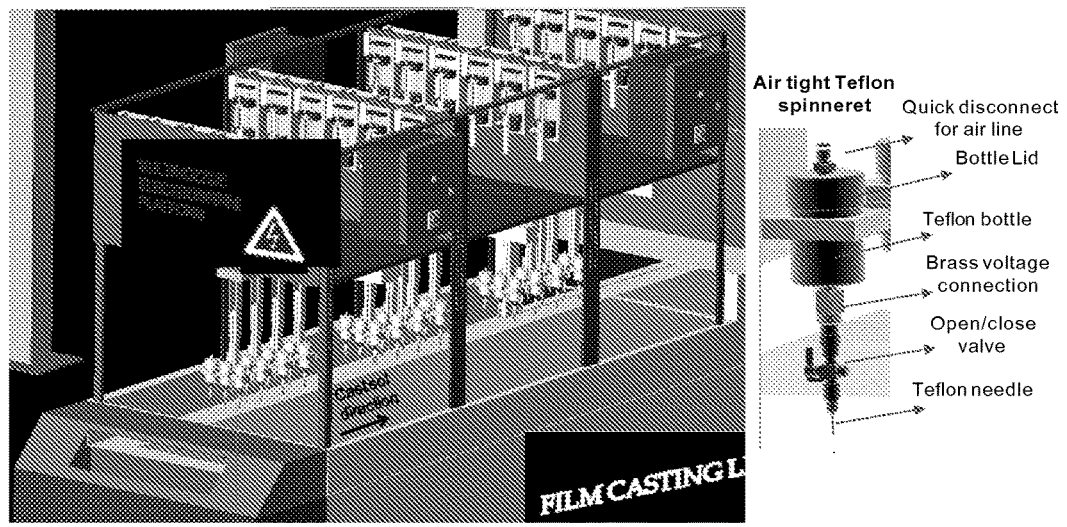
FIG. 10 is a drawing of a multi-nozzle electrospinning and a single spinneret.

Each group of spinnerets is held by a linear actuator that rasterizes the width of the cast film or any carrier moving underneath the multi-nozzle spinning/spraying platform. A closer look at the multi-nozzle electrospinning section along with a spinneret is shown in FIG. 10.

There are two different approaches to hybrid film preparation using this platform technology. In one approach, the base polymer layer is cast onto a moving endless belt and nanofibers are directly spun onto the liquid layer, similar to a wet spinning process, moving under the spinnerets. The fibers penetrate partially or completely into the liquid layer. Several factors influence the successful incorporation of the nanofibers into the cast liquid layer. The level of electrical forces, wetting characteristics of the fibers by the liquid layer, density of the fibers and surface tension play a major role. The subsequent solvent evaporation is facilitated in the heating chambers of the casting line.

In the second approach, the nanomat is first prepared by the multi-nozzle electrospinning section and subsequently the polymer solution layer is cast on top of it by a doctor blade or a vertical slot die. The solution impregnated nanomat then goes through the heating sections where the solvents are evaporated forming the hybrid film. In the present invention the second approach is primarily used.

Materials and Process Conditions:

Electrospinning Solution:

The electrospinning solution consists of a high $M_W$ (weight average $M_w$ 4,000,000) PEO dissolved in an aqueous solution of intrinsically conductive polymer, poly(3,4 ethyenedioxythiophene):poly(styrenesulfonic acid) (PEDOT:PSS). Specifically, 0.07 grams of PEO ($M_W$=4,000,000) from Scientific Polymers Inc. is added into 10 grams of Orgacon S203 (water dispersion of PEDOT:PSS at 1.1 weight percent) from Agfa. The concentration of PEO in the electrospinning solution is 0.7 weight percent and the final concentration of PEDOT:PSS in the dry nanofiber is about 60 weight percent. The solution is prepared by stirring at room temperature until a homogenous solution is achieved.

Film Casting Solution:

Soluble colorless grade polyimide (PI—from Akron Polymer Systems) is dissolved in NMP (Sigma Aldrich) at 5 weight percent concentration. A PMMA solution is prepared by dissolving 10 weight percent PMMA in DMF.

The electrospinning process is carried out at 5 KV and 15 cm tip to target distance. The PMMA and PI solution is cast onto the electrically conducting nanomat and the solvent is evaporated from the hybrid film using a heated laminar flow and electric under-bed heaters. In the case of PI, the solution is evaporated at 60° C. in 12 hours whereas for PMMA solution in DMF, the solvent removal duration is 2 hours. Further heat treatment is carried out at 120° C. for 1 hour under vacuum.

Characterization:

Morphology:

Optical microscopy pictures are taken with a Micro Publisher 5.0 RTV camera from Qimaging Inc. attached to a Laborlux 12 Pol S Microscope from Leitz Wetzlar Germany. Scanning electron microscope pictures are obtained using JEOL JSM-7401F field emission scanning electron microscope with an accelerating voltage of 5 KV and a current of 20 μA. Before SEM test, the sample is sputter coated with platinum at a current of 40 mA for 40 seconds.

Transmittance:

UV-Visible spectrum is carried out by directly measuring the film in ambient atmosphere using HP 8453 spectrometer from wavelength of 190 nm to 1000 nm.

Surface Resistivity:

Two different methods are used to measure the surface resistivity (Ω/sq) of the films. In the first method, the following geometry with a two point probe is used in accordance with ASTM D4496-04. The surface resistance R (Ω) is measured by a Keithley SourceMeter (Model 6430 Sub-Femtoamp). The electrodes are prepared by a conductive silver epoxy paint Tra-Duct 2902 from Emerson & Cuming.

Figure 11:
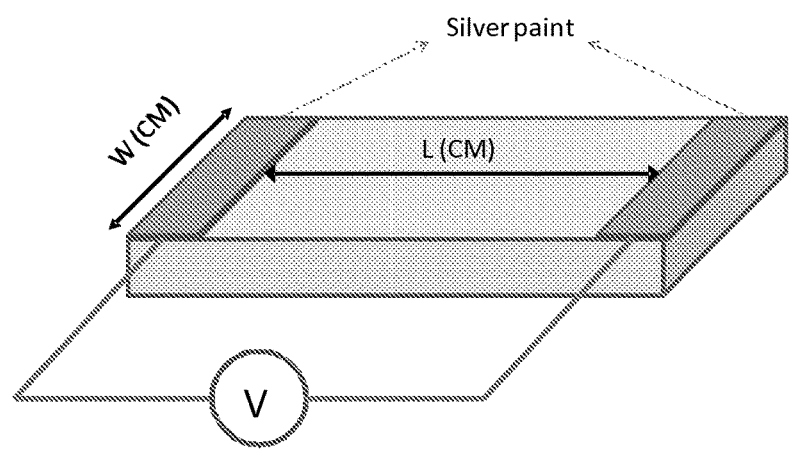
FIG. 11 is a drawing of the geometry for surface resistivity measurement.

FIG. 11 details the geometry for surface resistivity measurements where: Rs=V/I=Surface resistance (Ω), ρs=Rs×(W/L)=surface resistivity (Ω/sq), where w is the width of the specimen and electrode, and L is the length of the specimen between electrodes.

Figure 16:
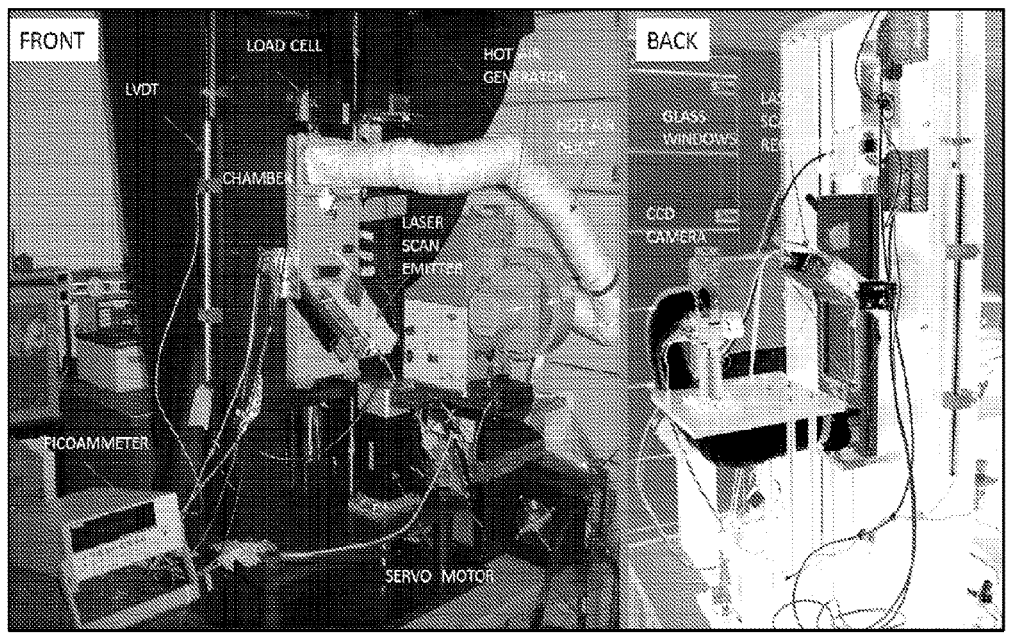
FIG. 16 is a photograph of a uniaxial stretching machine.
Figure 17:
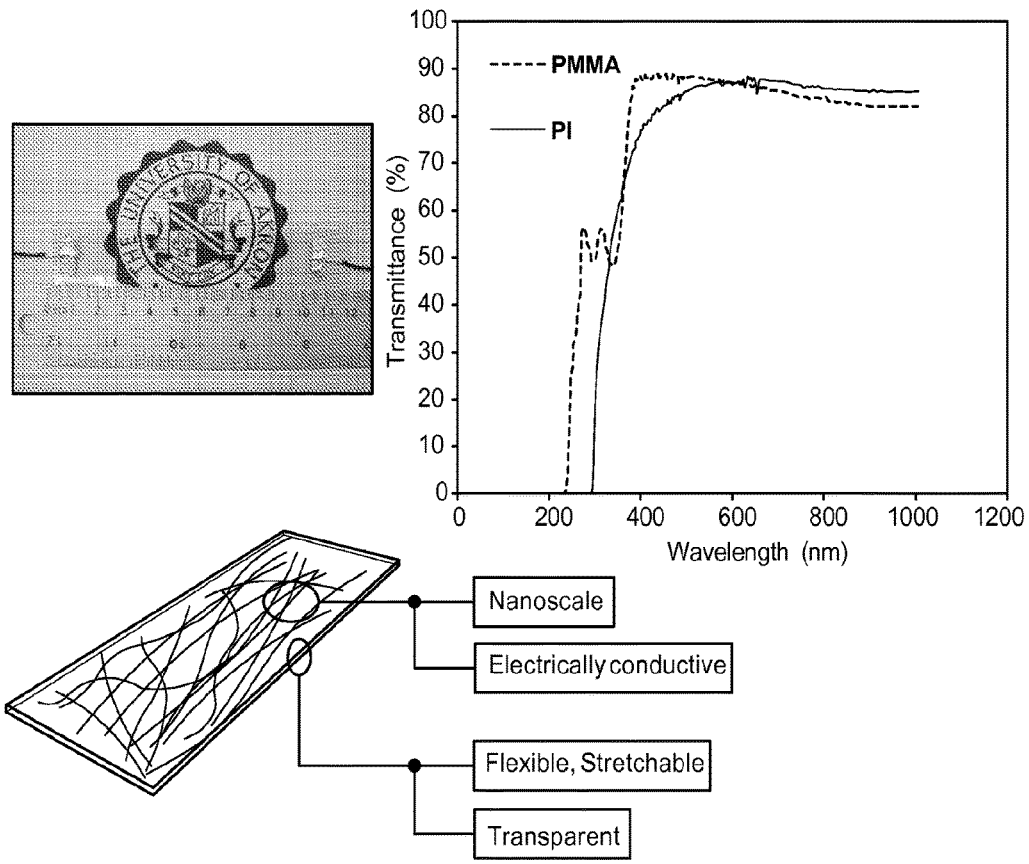
FIG. 17 is a depiction of transmittance measurements.

Surface Resistivity During Bending and Stretching:

In order to measure the surface resistivity of the films during stretching and bending, a special uniaxial stretching machine developed in our lab is used. The uniaxial stretching system shown in FIG. 16 allows the real time determination of true stress, strain, birefringence and surface resistivity simultaneously during stretching. Online spectral birefringence is essentially based on the method described by Beekmans and Posthumna de Boer et al. In this method white light is used as the light source to get the order number of retardation automatically. To measure the birefringence, the thickness must be measured at the same time and at the same location where the birefringence is measured. This is accomplished by moving the two crossheads of the stretching frame in opposing directions allowing the narrowest symmetry plane of the sample to remain spatially stationary. A laser micrometer mounted at 45° to the horizontal plane is focused at this stationary symmetry plane such that it continuously monitors the width of the sample during the course of stretching and holding stages. The temporal development of thickness and thus cross-sectional areas are then determined utilizing uniaxial symmetry and (Equation 1) with the knowledge of initial thickness and widths.

For elongation we consider three parameters, i.e., engineering, true, and hencky strain engineering strain is defined as the ratio of elongation (difference between the final length and the initial length) to the initial length of the sample. As for true strain which applies nominal (fully langrangian) definition, we relate the elongation to the reduction in the local width of the sample decrease in width using transverse isotropy assumption and use incompressibility assumption to formulate width based elongation (Equation 3). This is the same local region where the retardation measurements are made. For hencky strain, we use the logarithmic definition of width based strain measurements (Equation 4). Following the Cauchy definition, true stress (Equation 4) is calculated by dividing instantaneous force measured by a load cell with the instantaneous cross-sectional area using real time width measurement and transverse isotropy (Equation 2). These relationships and the derivations are:

$$\frac{W_t}{W_o} = \frac{D_t}{D_o} \qquad \text{Eq. 1}$$

$$D_o W_o L_o = D_t W_t L_t \qquad \text{Eq. 2}$$

$$TrueStrain = \frac{Elongation}{InitialLength} = \frac{L_t - L_o}{L_o} = \frac{\Delta L}{L_o} = \left(\frac{W_o}{W_t}\right)^2 - 1 \qquad \text{Eq. 3}$$

$$HenckyStrain = \text{Ln}\left(\frac{L_t}{L_o}\right) = \text{Ln}\left(\frac{W_o}{W_t}\right)^2$$

$$TrueStress = \frac{Force}{CrossSectionalArea} = \frac{F_t}{W_t D_t} = \frac{F_t}{\left[\left(\frac{W_t^2}{W_o}\right)D_o\right]} \qquad \text{Eq. 4}$$

where: $W_t$=Real time width of the film, $W_o$=Initial width of the film, $D_o$=Initial film thickness, $D_t$=real time film thickness, $L_o$=Initial length of the film, $L_t$=Real time length of the film, $F_t$=Force.

Figure 12:
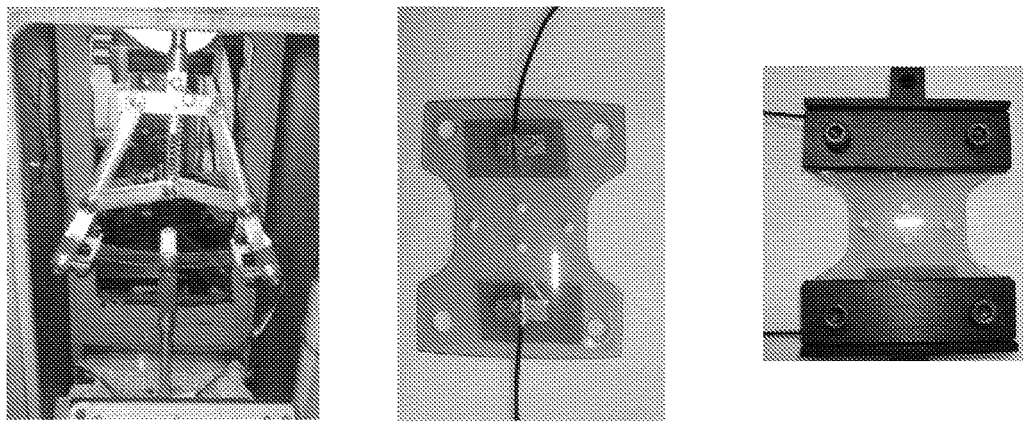
FIG. 12 are photographs of clamp for bending test (left) in the chamber, tensile test sample with electrical wire connects (middle), tensile test sample in the clamp.
Figure 13:
FIG. 13 is photograph of large area PMMA transparent electrically conducting film.

Surface resistivity during stretching was measured using the two point probe method shown in FIG. 11. The middle and the right photos in FIG. 12 show the sample with silver paints and wire connects before and after inserting in the clamp, respectively. The left photo in FIG. 12 shows the clamp for the bending test. For the case of bending experiments, birefringence and mechanical data was not collected. A picture of a large area electrically conducting film prepared using this technology is shown in FIG. 13.

Figure 14:
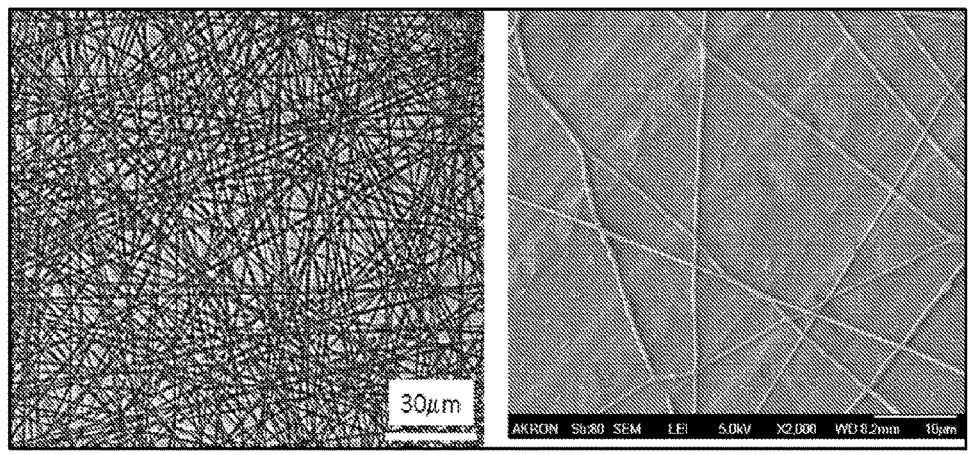
FIG. 14 are photographs of optical microscopy (left) and SEM (right) of electrically conductive PEDOT:PSS/PEO nanofibers.

FIG. 14 provides photographs of the optical microscopy (left) and SEM image (right) of the as-spun nanofibers. Optical microscopy image reveals the randomly distributed nature of the fine nanofibrous network whereas SEM shows that the average diameter of the fibers is around 300 nm lower than the wavelength of the visible spectrum 400 to 700 nm.

In the as-spun form, the nanofiber mats show a white to lightly bluish color, due to the porous structure which causes light scattering. After casting the polymer solutions on the nanomat, however, the wet film appears transparent. There are two important parameters for transparency, namely size of the fibers and refractive index matching. The small diameter of the fibers along with fairly good refractive index matching with the solution cast polymer film render the final hybrid films transparent. The UV-visible light transmittance measurements show that for both PMMA and PI substrate film the transmittance is higher than 85% at 550 nm transmittance. In fact, the transmittance changes depending on the used substrate and the transmittance decrease by the embedded nanofibers is almost negligible for a film with 2 kΩ/sq surface resistivity.

Figure 15:
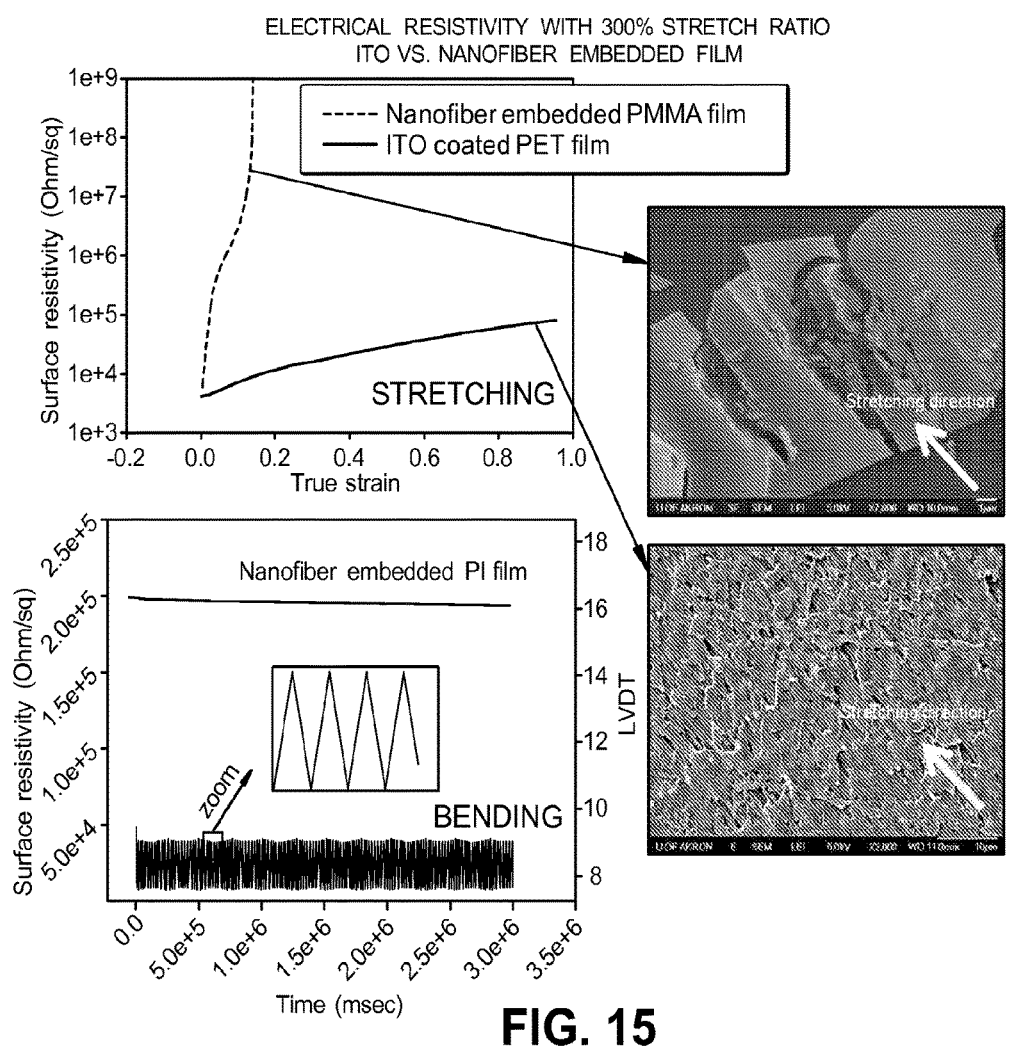
FIG. 15 is a depiction of surface resistivity during stretching.

FIG. 15 shows a PMMA film that was stretched to 300% at a temperature of 105° C. about 20° C. above $T_g$ of the film. During stretching, the surface resistivity of the film was monitored. In the stretching process, the surface resistivity of the film increases very slightly at 300%. As a comparison, the PET film coated with 250A ITO was stretched to the same elongation. In the case of ITO coated PET, a catastrophic failure happened before 20% which was due to the brittle nature of inorganic ITO material. SEM pictures detail the conductive network in the stretched films survived large strains whereas the ITO coated films were broken immediately.

In the case of bending test, conductive nanofiber embedded PMMA film was bended around a rod with a diameter of 6 mm which causes the film to undergo a maximum curvature of ⅓ mm$^{-1}$. The conductivity of the film maintains at the same level after bending for more than 1000 times.

Further Embodiments

In another embodiment, the present invention utilizes a combination of any one or more spinnable polymer (i.e., polymer that can be electrospun), whether conductive or not, and at least one electrically conductive material (as described above and reiterated herein below) to produce fibers, nanofibers, structures, and/or nanostructures that are conductive.

In one embodiment, the amount of the at least one electrically conductive material, when present in the electrospinning solution, is in the range from about 0.1 weight percent to about 50 weight percent, or from about 0.5 weight percent to about 47.5 weight percent, or from about 1 weight percent to about 45 weight percent, or from about 2.5 weight percent to about 40 weight percent, or from about 5 weight percent to about 35 weight percent, or from about 7.5 weight percent to about 30 weight percent, or from about 10 weight percent to about 27.5 weight percent, or from about 12.5 weight percent to about 25 weight percent, or from about 15 weight percent to about 22.5 weight percent, or even from about 17.5 weight percent to about 20 weight percent. In still another embodiment, the at least one electrically conductive material, when present in the electrospinning solution, is less than about 10 weight percent. Here, as well as elsewhere in the specification and claims, individual numerical range values, or limits, can be combined to form additional non-disclosed, or new, ranges.

As noted above, suitable electrically conductive materials for utilization in, or with, an electrospinning solution of a polymer include, but are not limited to, carbon-based components (e.g., including, but not limited to, carbon nanotubes or nanostructures, precursor compounds that generate conductive carbon compounds or structures upon heating and/or graphitization), conductive metal particles and/or nanoparticles (e.g., gold, silver, copper, etc. nanoparticles), conductive metal alloy particles and/or nanoparticles, or a combination of two or more thereof.

In still another embodiment, a manufacturing method in accordance with the present invention permits the orientation of the conductive fibers and/or conductive nanofibers using an array of electrodes on which the nanofibers are spun, thereby permitting the nanofibers to be oriented on at least one surface including, but not limited to, exhibiting some orientation gradient across the thickness direction.

Figure 18:
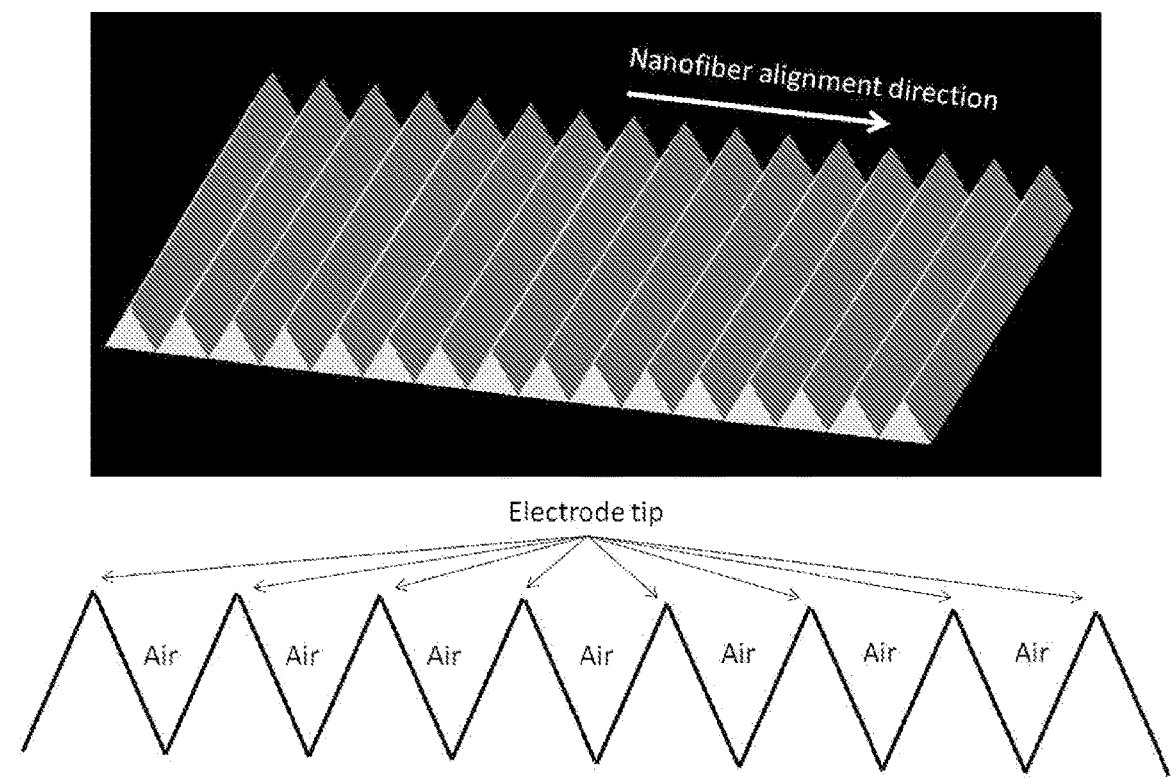
FIG. 18 is a drawing illustrating a corrugated collector that can be utilized in conjunction with one embodiment of the present invention to yield oriented nanofibers.
Figure 19:
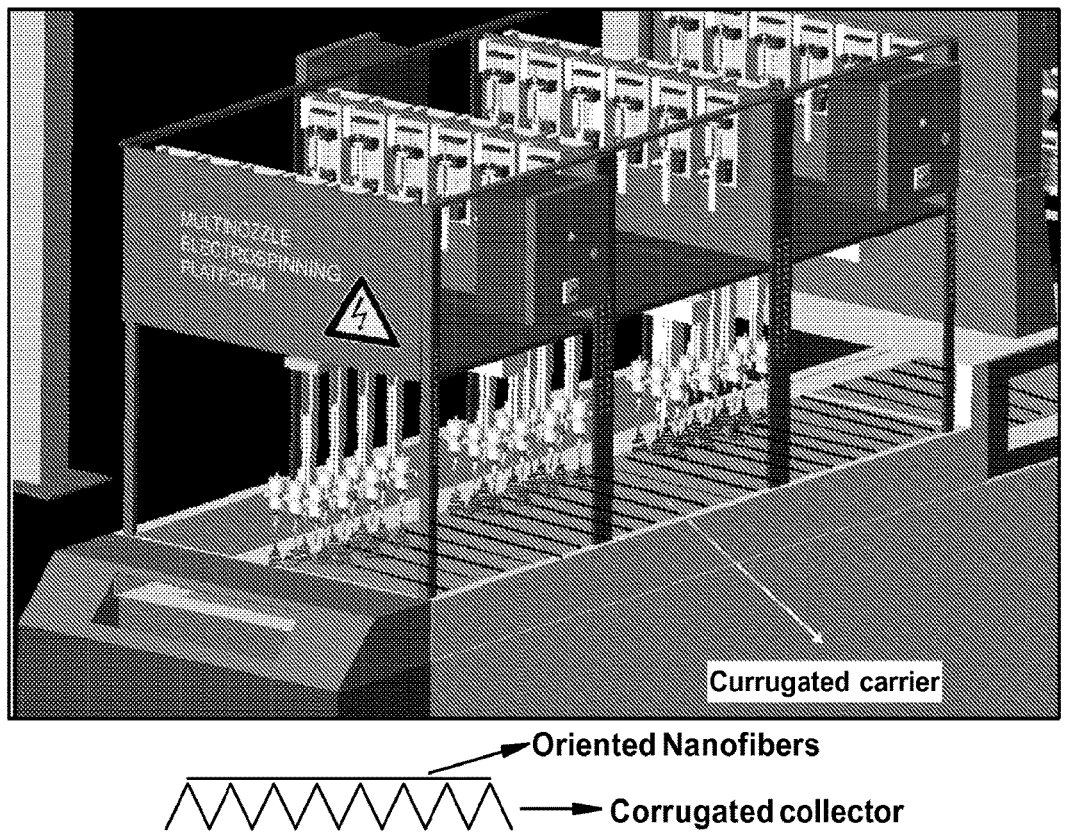
FIG. 19 is a drawing of a multi-nozzle electrospinning platform similar to that of FIG. 10 which can be utilized to deposit oriented nanofibers on the corrugated surface of FIG. 18.

Oriented Fiber/Nanofiber Production:

In one embodiment, the present invention relies on a continuous corrugated collector (see FIG. 18) which provides a plurality of ground electrode pairs separated by non-conducting air medium. Such corrugated surfaces can be readily prepared and are available as a carrier belt ideal for continuous processing in roll-to-roll (R2R) operations. FIG. 19 is a drawing of a multi-nozzle electrospinning platform similar to that of FIG. 10 which can be utilized to deposit oriented nanofibers on the corrugated surface of FIG. 18. The structures of FIGS. 18 and 19 can be utilized, in one embodiment, to produce fibers, nanofibers, or structures formed therefrom that contain oriented fibers thereby yielding an increase in electrical conductivity in one direction based on the nature of the orientation of the fibers/nanofibers. In another embodiment, the present invention utilizes non-oriented and/or randomly oriented fibers/nanofibers. In this case, the electrically conductivity of such fibers are generally, or substantially, equal in all directions.

For instance, roll-to-roll (R2R) equipment equipped with a multi-nozzle spinning platform and corrugated conducting carrier can be used for continuous production of fiber and/or nanofiber mats that contain oriented fibers/nanofibers. An exemplary setup for producing such structures is illustrated in FIG. 18.

Figure 20:
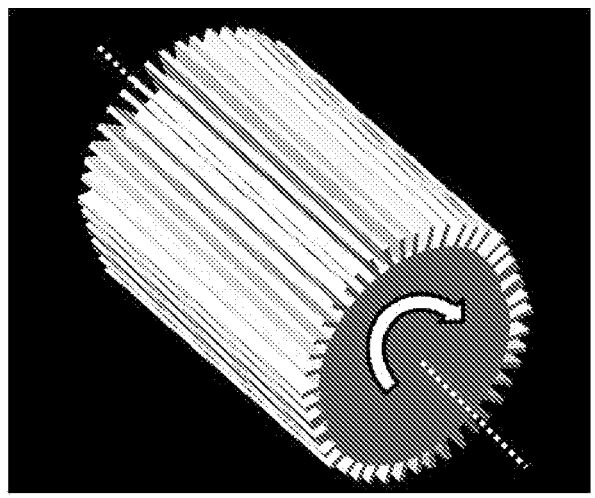
FIG. 20 is a drawing illustrating a rotating cylinder with a corrugated surface that can be utilized to collect oriented nanofibers in accordance with one embodiment of the present invention.

Orientation of the fibers can also be induced mechanically either by a fast rotating or moving target in the form of a cylinder (Sundaray, B., et al.; (2004); *Electrospinning of Continuous Aligned Polymer Fibers*; Applied Physics Letters; 84(7); pp. 1222 to 1224) or a belt. Combining the idea of fast rotating drum and corrugation would cause both the mechanical and electrical alignment of nanofibers leading to improved orientation of the electrically conductive electrospun fibers/nanofibers. One embodiment of a suitable cylinder is shown in FIG. 20.

With a corrugated collector, the fibers/nanofibers can be deposited in the aligned configuration for a long period of time. However, after the thickness of the collected mat reaches about 50 micrometers, the efficiency of alignment decreases due to the fact that the fibers insulate the collector. In order to remedy this and prolong the deposition time of aligned nanofibers, a negative voltage can be applied to the target.

Figure 21:
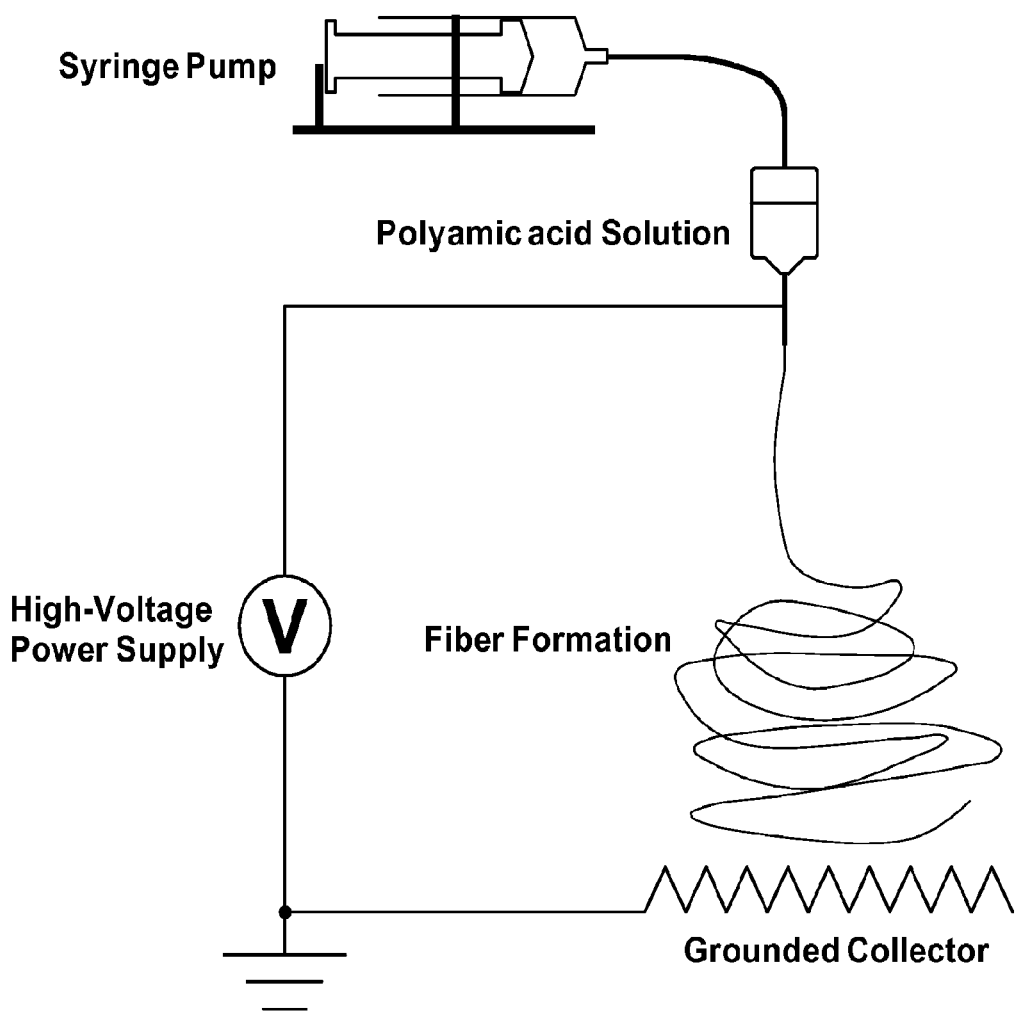
FIG. 21 is a drawing illustrating exemplary electrospinning setup that can be used in conjunction with the present invention.

Additionally, FIG. 21 illustrates another possibility for collecting oriented fibers/nanofibers via an electrospinning process. In the device of FIG. 21, a corrugated collector is utilized in an electrospinning device so as to facilitate the orientation, or desired alignment, of the fibers/nanofibers so produced.

Thus, in light of the above, the present invention relates to a flexible and electrically conductive polymer film comprising: at least one electrically conductive nanofiber, or nanofiber structure, embedded in, located on, or attached to at least one polymer film, wherein the at least one electrically conductive nanofiber, or nanofiber structure, is formed from a electrospinning process and wherein the at least one polymer film is flexible. In another embodiment, the present invention relates to a method for producing a flexible and electrically conductive polymer film comprising the steps of: (A) preparing at least one electrospinnable polymer composition; (B) electrospinning the at least one electrospinnable polymer composition to produce at least one electrically conductive nanofiber, or nanofiber structure, to produce an electrically conductive electrospun structure; and (C) casting at least one polymer film onto the electrically conductive electrospun structure of Step (B) to yield a flexible and electrically conductive polymer film, wherein the electrospinnable polymer composition of Step (A) is itself electrically conductive, or the electrospinnable polymer solution contains at least one electrically conductive material therein, and wherein the at least one electrically conductive nanofiber, or nanofiber structure, is located on or in, or is partially embedded in, the cast film of Step (C).

In another embodiment, the present invention relates to a method for producing a flexible and electrically conductive polymer film comprising the steps of: (i) casting at least one polymer film onto a suitable surface; (ii) preparing at least one electrospinnable polymer composition; (iii) electrospinning the at least one electrospinnable polymer composition to produce at least one electrically conductive nanofiber, or nanofiber structure, on, in, or partially embedded in the cast film of Step (i), wherein the electrospinnable polymer composition of Step (ii) is either itself electrically conductive, or the electrospinnable polymer solution contains at least one electrically conductive material therein.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What is claimed is:

1. A method for producing a flexible, transparent, and electrically conductive polymer film comprising the steps of:
   (i) casting at least one flexible, transparent, dielectric polymer film onto a suitable surface, the flexible, transparent, dielectric polymer film providing a liquid layer;
   (ii) preparing at least one electrospinnable polymer composition from a combination of at least one electrically conductive material and at least one electrospinnable polymer; and
   (iii) directly electrospinning the at least one electrospinnable polymer composition onto the flexible, transparent, dielectric polymer film of Step (i), whereby the at least one electrospinnable polymer composition penetrates partially or completely into the liquid layer to produce one or more electrically conductive nanofibers fully or partially embedded in the cast film of Step (i), wherein the one or more electrically conductive nanofibers render the film electrically conducting and define open spaces to retain transparency in the flexible, transparent, and electrically conductive polymer film, wherein the flexible, transparent, and electrically conductive polymer film is suitable for use in a flexible display application,
   wherein the flexible, transparent, and electrically conductive polymer film includes the one or more electrically conductive nanofibers in an amount greater than 0 and less than 1 weight percent.

2. The method of claim 1, wherein the one or more electrically conductive nanofibers have an average diameter in the range of about 1 nanometer to about 25,000 nanometers.

3. The method of claim 2, wherein the one or more electrically conductive nanofibers have an average diameter in the range of about 10 nanometers to about 500 nanometers.

4. The method of claim 1, wherein the polymer film has a transmittance in the visible light range of at least about 50 percent.

5. The method of claim 4, wherein the polymer film has a transmittance in the visible light range of at least about 75 percent.

6. The method of claim 1, wherein the at least one electrically conductive material is selected from one or more carbon-based components, one or more conductive metal nanoparticles or nanostructures, one or more conductive metal particles or structures, one or more conductive metal alloy nanoparticles or nanostructures, one or more conductive metal alloy particles or structures, or a combination of two or more thereof.

7. The method of claim 1, wherein the at least one electrospinnable polymer is selected from one or more poly(ethylene oxides), one or more polyimides, or a combination of two or more thereof.

8. The method of claim 1, wherein the at least one electrically conductive material is present in the at least one electrospinnable polymer composition in an amount from 0.1 weight percent to less than 10 weight percent.

9. The method of claim 8, wherein the at least one electrically conductive material is present in the at least one electrospinnable polymer composition in an amount from 0.1 weight percent to 5 weight percent.

10. The method of claim 1, wherein the at least one electrospinnable polymer composition is formed from a mixture of poly(ethylene oxides), poly(3,4-ethylenedioxythiophene) and poly(styrenesulfonate).

11. The method of claim 1, wherein, in said step of directly electrospinning, the one or more electrically conductive nanofibers are electrospun toward a corrugated collector such that the nanofibers are oriented nanofibers.

12. The method of claim 1, wherein the polymer film of Step (i) is selected from poly(methyl methacrylate) (PMMA), polyimide, polycarbonate, polyurethane and cyclopolyolefin polymer compositions.

13. A method for producing a flexible, transparent, and electrically conductive polymer film comprising the steps of:
(i) casting at least one flexible, transparent, dielectric polymer film onto a suitable surface, the flexible, transparent, dielectric polymer film providing a liquid layer, the cast film having a refractive index;
(ii) preparing at least one electrospinnable polymer composition from a combination of at least one electrically conductive material and at least one electrospinnable polymer; and
(iii) directly electrospinning the at least one electrospinnable polymer composition onto the flexible, transparent, dielectric polymer film of Step (i), whereby the at least one electrospinnable polymer composition penetrates partially or completely into the liquid layer to produce one or more electrically conductive nanofibers fully or partially embedded in the cast film of Step (i), thereby rendering the film electrically conducting, the one or more electrically conductive nanofibers matching the refractive index of the cast film as to retain transparency in the flexible, transparent, and electrically conductive polymer film,
wherein the flexible, transparent, and electrically conductive polymer film includes the one or more electrically conductive nanofibers in an amount greater than 0 and less than 1 weight percent.

14. A method for producing a flexible, transparent, and electrically conductive polymer film comprising the steps of:
(i) casting at least one flexible, transparent, dielectric polymer film onto a suitable surface, the flexible, transparent, dielectric polymer film providing a liquid layer having a solvent therein;
(ii) preparing at least one electrospinnable polymer composition from a combination of at least one electrically conductive material and at least one electrospinnable polymer;
(iii) directly electrospinning the at least one electrospinnable polymer composition onto the flexible, transparent, dielectric polymer film of Step (i), whereby the at least one electrospinnable polymer composition penetrates partially or completely into the liquid layer to produce one or more electrically conductive nanofibers fully or partially embedded in the cast film of Step (i), thereby rendering the film electrically conducting;
(iv) matching the refractive index of the one or more electrically conductive nanofibers with the refractive index of the cast film as to retain transparency in the flexible, transparent, and electrically conductive polymer film; and
(v) evaporating the solvent to produce the flexible, transparent, and electrically conductive polymer film, wherein the flexible, transparent, and electrically conductive polymer film retains transparency following said step of evaporating,
wherein the flexible, transparent, and electrically conductive polymer film includes the one or more electrically conductive nanofibers in an amount greater than 0 and less than 1 weight percent.

15. The method of claim 13, wherein the at least one electrically conductive material is present in the at least one electrospinnable polymer composition in an amount from 0.1 weight percent to less than 10 weight percent.

16. The method of claim 14, wherein the at least one electrically conductive material is present in the at least one electrospinnable polymer composition in an amount from 0.1 weight percent to less than 10 weight percent.

* * * * *